United States Patent [19]

Nobutoki et al.

[11] Patent Number: 5,272,699
[45] Date of Patent: Dec. 21, 1993

[54] METHOD OF MULTIPLEX TRANSMISSION

[75] Inventors: Yoshikazu Nobutoki; Masao Hideshima; Shigeyuki Satomura; Akira Sone, all of Hiroshima, Japan

[73] Assignee: Mazda Motor Corporation, Hiroshima, Japan

[21] Appl. No.: 881,294

[22] Filed: May 11, 1992

[30] Foreign Application Priority Data

May 13, 1991 [JP] Japan ................... 3-107587

[51] Int. Cl.[5] .............................. H04J 3/00
[52] U.S. Cl. ..................... 370/85.1; 370/85.15
[58] Field of Search ............ 370/13, 85.1, 85.3, 370/85.12, 85.15, 110.1; 371/48, 62

[56] References Cited

U.S. PATENT DOCUMENTS

| 4,689,785 | 8/1987 | Toyonaga et al. | 370/85.3 |
| 4,939,725 | 7/1990 | Matsuda et al. | 370/85.3 |
| 4,951,281 | 8/1990 | Muto et al. | 370/95.2 |
| 5,023,871 | 6/1991 | Nakayashiki et al. | 370/85.1 |
| 5,079,765 | 1/1992 | Nakamura | 370/85.13 |

FOREIGN PATENT DOCUMENTS 61-224634 6/1986 Japan .

Primary Examiner—Benedict V. Safourek
Attorney, Agent, or Firm—Sixbey, Friedman, Leedom & Ferguson

[57] ABSTRACT

A method of multiplex transmission for effecting multiplex transmission among a plurality of multiplex nodes is disclosed. The multiplex nodes are connected to a transmission path in which each multiplex node has its own node connection information for controlling its signal transmission and reception, and is capable of controlling and correcting the node connection information such that when a first multiplex node finds that a second multiplex node is in a normal state according to the node connection information of the first multiplex node and the remaining multiplex nodes find that the second multiplex node is in an abnormal state according to the node connection information of the remaining multiplex nodes, and when it is recognized that there is inconsistency in the node connection information between the first multiplex node and the remaining multiplex nodes and that a state of the second multiplex node should be recognized as normal, the remaining multiplex nodes transmit a request signal, which request the second multiplex node to transmit a return-to-normal signal which represents that the second multiplex node as returned to normal. Wherein the remaining multiplex nodes transmit the request signal at a predetermined time after the recognition of the inconsistency if they have received no request signal transmitted from any other multiplex node by that time, the predetermined time differing from node to node, the remaining multiplex nodes transmit no request signal if they have received a request signal transmitted from any other multiplex node.

4 Claims, 5 Drawing Sheets

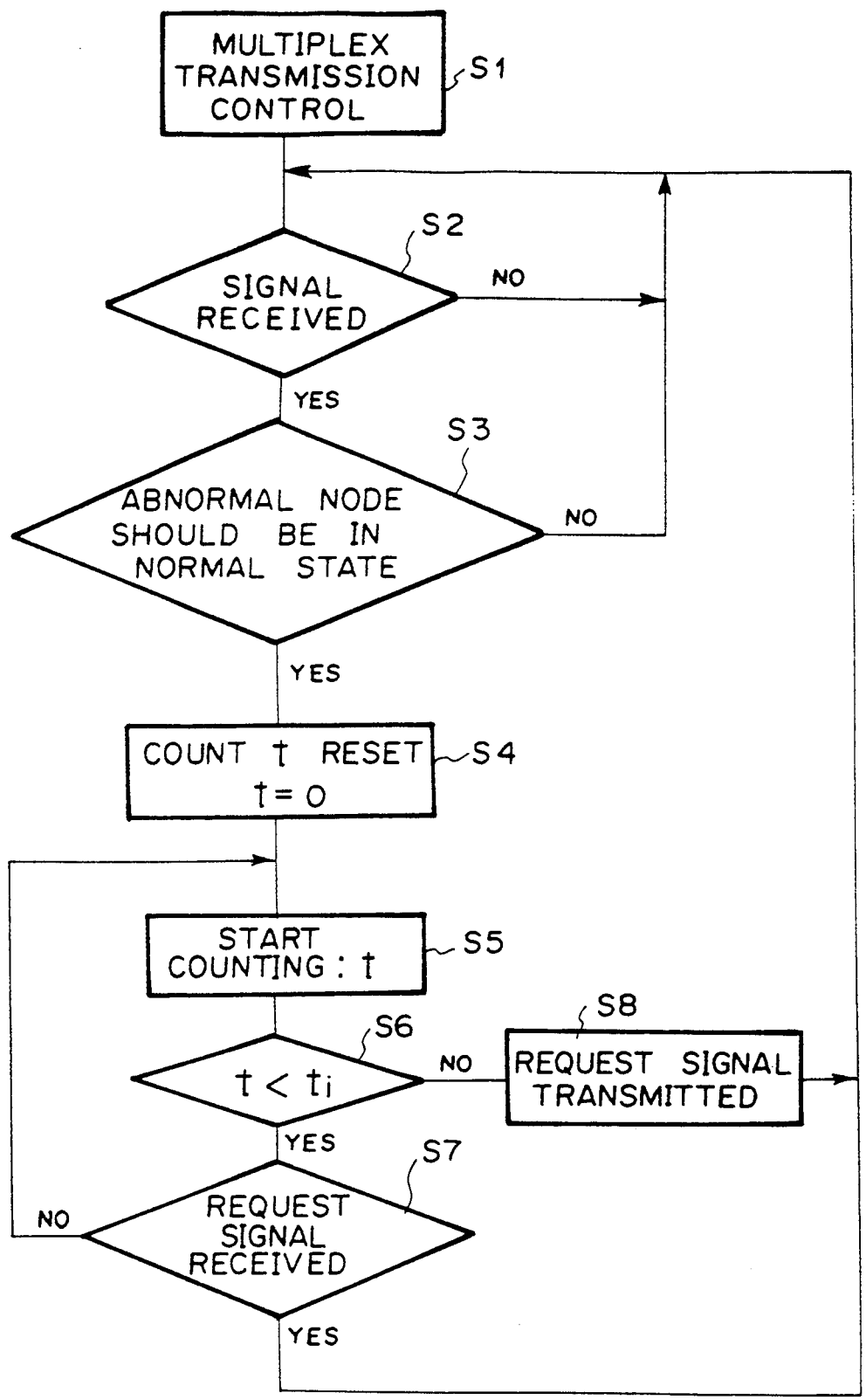

METHOD OF MULTIPLEX TRANSMISSION

BACKGROUND OF THE INVENTION

1. Field of the Invention

This invention relates to a method of multiplex transmission which is employed, for instance, in a vehicle, and more particularly to a method of multiplex transmission in which each multiplex node has its own node connection information and controls the node connection information for itself.

2. Description of the Prior Art

Recently increasing number of electronic instruments are mounted on a vehicle, which gives rise to a problem that the wiring between the instruments becomes too large and too complicated. In order to overcome such a problem, it has been proposed and put into practice to transmit signals between the instruments by multiplex transmission, that is, to connect multiplex nodes for the respective instruments to a common transmission path and transmit signals between the multiplex nodes by multiplex transmission. See, for instance, Japanese Unexamined Patent Publication No. 61(1986)-224634.

As a multiplex transmission system, there has been known a distributed control system, as a time division multiplex transmission system, in which each of the multiplex nodes controls its signal transmission and reception for itself independently from the other multiplex node. In such a distributed control system, there can be considered a system in which each multiplex node has its own node connection information for controlling its signal transmission and reception, and controls and corrects the node connection information for itself. The node connection information as used here means information on the condition of connection to the transmission path of each of the multiplex nodes which are connected to the transmission path to form a network, that is, on whether the communication system of each multiplex node is in normal state or in abnormal state.

In such a multiplex transmission, there arises trouble in multiplex transmission control of the overall network if there is an inconsistency between node connection informations of the multiplex nodes. Accordingly, when there is an inconsistency between node connection informations of the multiplex nodes, the node connection information must be corrected so that the node connection informations of the multiplex nodes are all equal to each other. Such a correction may be effected through a procedure in which, when one multiplex node realizes that another multiplex node which should be in abnormal state according to the node connection information of said one multiplex node should be in normal state according to the node connection informations of the other multiplex nodes, said one multiplex node transmits a request signal which requests to said another multiplex node to transmit a return-to-normal signal which represents that said another multiplex node has returned to normal and corrects its own node connection information when it receives the return-to-normal signal from said another multiplex node.

Further, the node connection informations of the respective multiplex nodes must be corrected each time the condition of connection changes. For this purpose, there can be considered a procedure in which, when one multiplex node which has been in abnormal state returns to normal, said one multiplex node transmits a return-to-normal signal, and the other multiplex nodes transmit, upon reception of the return-to-normal signal, request signals for requesting said one multiplex node to re-transmit the return-to-normal signal in order to check whether said one multiplex node has really returned to normal and correct their own node connection informations when said one multiplex node re-transmits the return-to-normal signal in response to the request signal.

However the former procedure gives rise to a problem that if one multiplex node transmits a node connection information and a plurality of multiplex nodes realize that a multiplex node which should be in abnormal state according to their own node connection informations should be in normal state according to the node connection informations of said one multiplex node and simultaneously transmit the return-to-normal signals, the traffic amount on the transmission path excessively increases, which can cause various problems.

Also in the latter procedure, there arises a problem that if one multiplex node returns to normal and transmits the return-to-normal signal, the other multiplex nodes can simultaneously transmit the request signals and the transmit amount can excessively increase.

SUMMARY OF THE INVENTION

In view of the foregoing observations and description, the primary object of the present invention is to provide a method of multiplex transmission in which the node connection information can be corrected without largely increasing the traffic amount when an inconsistency between node connection informations of the multiplex nodes is realized.

Another object of the present invention is to provide a method of multiplex transmission in which the node connection information can be corrected without largely increasing the traffic amount when a multiplex node which has been in abnormal state returns to normal.

In accordance with a first aspect of the present invention, when one multiplex node realizes that another multiplex node which should be in abnormal state according to the node connection information of said one multiplex node should be in normal state according to the node connection information of one or more of the other multiplex nodes, said one multiplex node transmits a request signal which requests to said another multiplex node to transmit a return-to-normal signal which represents that said another multiplex node has returned to normal and corrects its own node connection information when it receives the return-to-normal signal from said another multiplex node. The multiplex nodes are arranged so that each of them transmits said request signal a predetermined time after realization of the inconsistency in the node connection informations, the predetermined time differing from node to node, and does not transmit the request signal when it receives the request signal transmitted from any other multiplex node.

Thus in accordance with the first aspect of the present invention, only one multiplex node actually transmits the request signal even if a plurality of multiplex nodes simultaneously realize an inconsistency in the node connection informations, whereby the traffic amount cannot be largely increased. That is, the multiplex node whose waiting time (said predetermined time) is the shortest transmits the request signal and when the other multiplex nodes receive the request signal, they no longer transmit the request signal. If the multiplex node whose waiting time is the shortest does not transmit the request signal for some reason, then the multiplex node whose waiting time is the second shortest transmits the request signal and when the other multiplex nodes receive the request signal, they no longer transmit the request signal. When the multiplex node which is to be in abnormal state according to the node connection informations of the part of the multiplex nodes transmits the return-to-normal signal, the part of the multiplex nodes correct their own node connection informations.

In accordance with a second aspect of the present invention, when one multiplex node which has been in abnormal state returns to normal, said one multiplex node transmits a return-to-normal signal, and the other multiplex nodes transmit, upon reception of the return-to-normal signal, request signals for requesting said one multiplex node to re-transmit the return-to-normal signal in order to check whether said one multiplex node has really returned to normal and correct their own node connection informations when said one multiplex node re-transmits the return-to-normal signal in response to the request signal. The multiplex nodes are arranged so that each of them transmits said request signal a predetermined time after reception of the return-to-normal signal, the predetermined time differing from node to node, and does not transmit the request signal when it receives the request signal transmitted from any other multiplex node.

Thus in accordance with the second aspect of the present invention, only one multiplex node actually transmits the request signal even if a plurality of multiplex nodes simultaneously receives the return-to-normal signal, whereby the traffic amount cannot be largely increased. That is, the multiplex node whose waiting time (said predetermined time) is the shortest transmits the request signal and when the other multiplex nodes receive the request signal, they no longer transmit the request signal. If the multiplex node whose waiting time is the shortest does not transmit the request signal for some reason, then the multiplex node whose waiting time is the second shortest transmits the request signal and when the other multiplex nodes receive the request signal, they no longer transmit the request signal. When the multiplex node which has returned to normal re-transmits the return-to-normal signal in response to the request signal, the other multiplex nodes correct their own node connection informations.

BRIEF DESCRIPTION OF THE DRAWINGS

FIG. 4 is a flow chart for illustrating an example of the procedure which each multiplex node performs upon realization of an inconsistency in the node connection informations.

DESCRIPTION OF THE PREFERRED EMBODIMENTS

Figure 1:
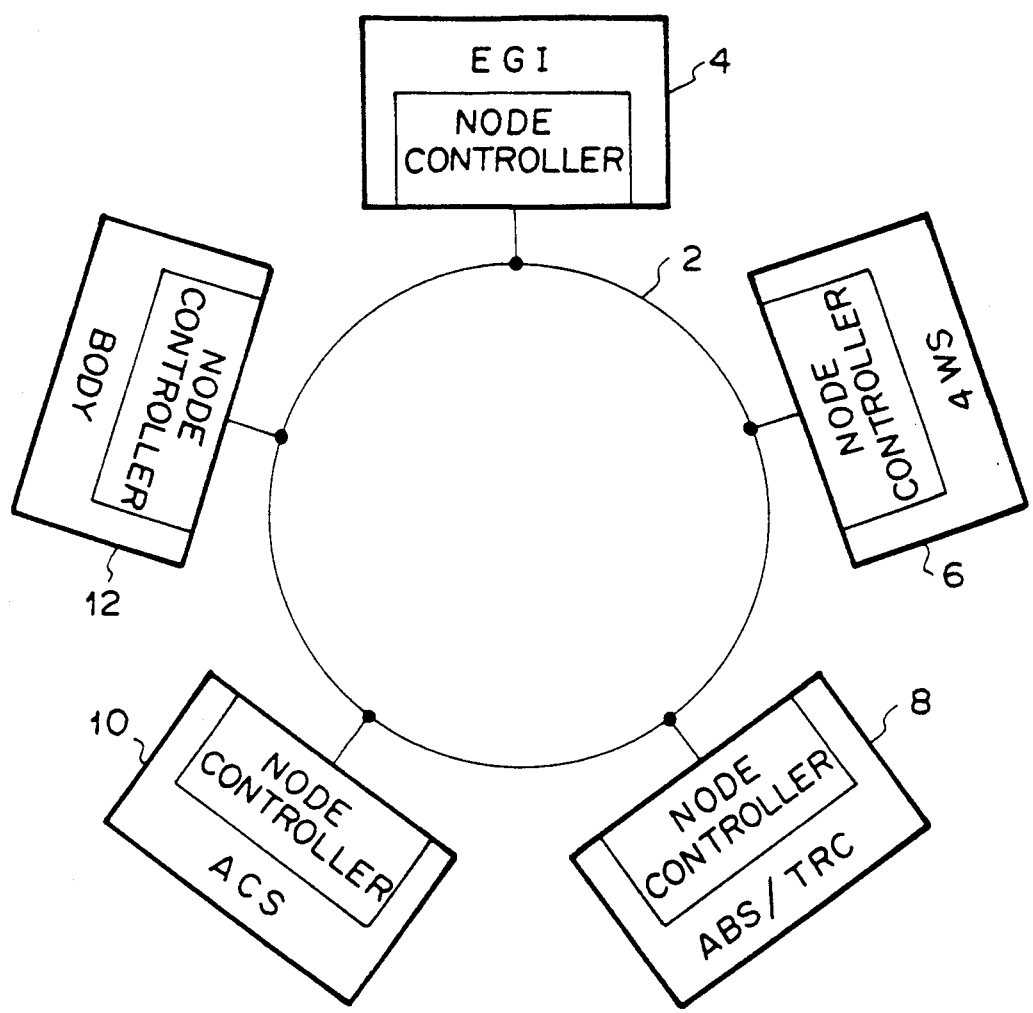
FIG. 1 is a block diagram showing a multiplex transmission system for carrying out the method of multiplex transmission in accordance with an embodiment of the present invention.

FIG. 1 shows a multiplex transmission system for a vehicle for carrying out a method of multiplex transmission in accordance with an embodiment of the present invention. The multiplex transmission system shown in FIG. 1 employs a network access system generally called CSMA/CD-AMP system. CSMA stands for Carrier Sense Multiple Access in which each multiplex node starts transmission after ascertaining vacancy of the transmission path, CD stands for Collision Detection in which each multiplex node watches signals transmitted through the transmission path and controls re-transmission of the signals upon detection of collision of the signals and AMP stands for Arbitration on Message Priority in which the signal whose priority is higher than that of the other signal is transmitted as it is upon collision of signals.

In FIG. 1, the multiplex transmission system has a multiplex transmission path (bus) 2 formed of a twist pair wire. Five multiplex nodes, an EGI node 4 having an EGI controller for controlling the engine of the vehicle, a 4 WS node 6 having a 4 ws controller for four-wheel steering control, an ABS/TRC node 8 having an ABS/TRC controller for controlling slip of the wheels, an ACS node 10 having an ACS controller for controlling an active suspension and a body node 12 having a controller for controlling switches related with the vehicle body are coupled together through the multiplex transmission path 2.

Signals are transmitted between the multiplex nodes 4, 6, 8, 10 and 12 through the multiplex transmission path 2 by the CSMA/CD-AMP multiplex transmission system which is a time division multiplex transmission system. A signal is transmitted from any one of the nodes and a signal transmitted from one of the nodes is received by all the other nodes.

Figure 2:
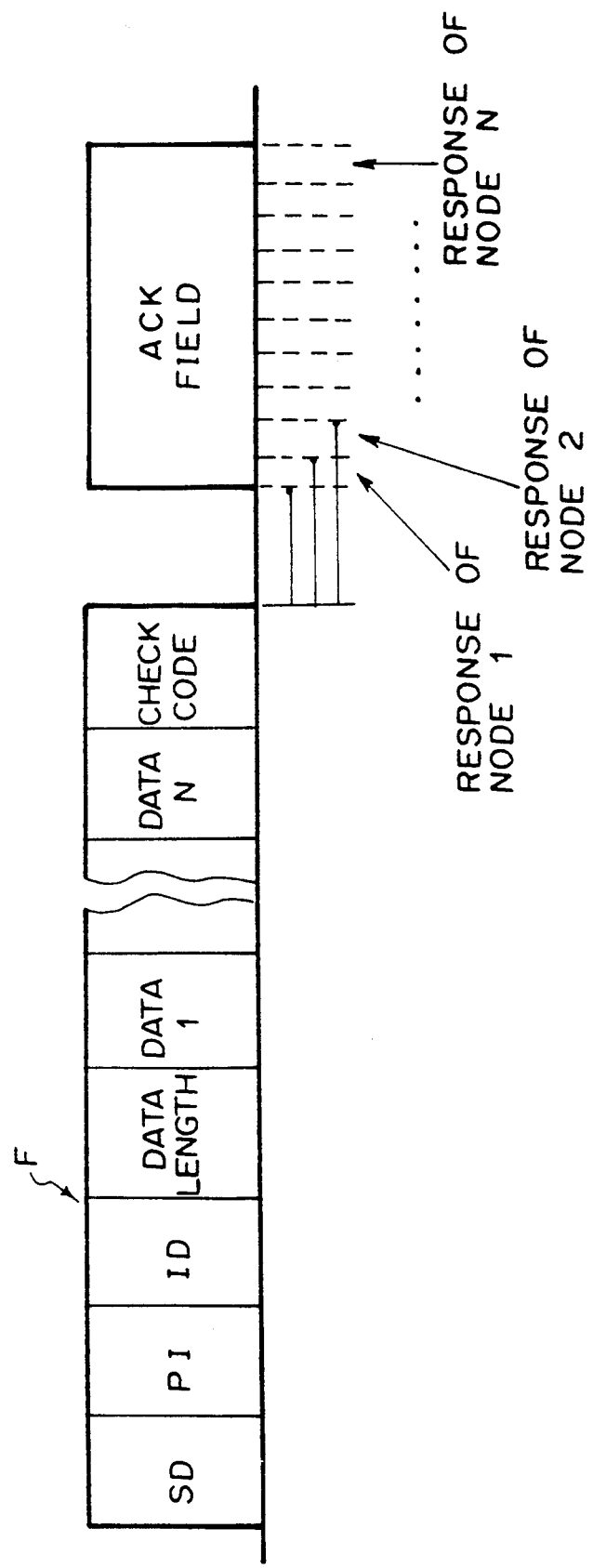
FIG. 2 is a view showing the arrangement of the signal frame.

Each of the nodes 4, 6, 8, 10 and 12 transmits information related thereto such as various driving informations, control informations and the like frame by frame, each frame having the format shown in FIG. 2. As shown in FIG. 2, each frame F includes a SD code, a PI code, a ID code, a data-length data, data 1 to data N and a check code.

The SD code (Start Delimiter code) is a specific code indicating the start of the frame F. The PI code (Priority code) is a code indicating the priority of the signal. That is, when a plurality of the multiplex nodes transmit data at one time and the signals collide with each other, the signals are processed according to their priorities. In this embodiment, the lower the bit value is, the higher the priority is. This is because the multiplex transmission path 2 is arranged so that the low level is "WIRED-OR". When signals are transmitted from a plurality of nodes at one time, the PI code from the node having the highest priority remains on the multiplex transmission path 2, and each of the nodes having lower priorities detects signal collision through the fact that the PI code which it transmitted changes to a different code and re-transmits the frame. The ID code is a code which indicates the node which transmits the frame. In the data-length field is written the number of data following this field. If the number of data is N, then N is written to indicate the data length. Upon reception of the frame, each multiplex node reads the data by the data length. In the data 1 to data N, various informations to be transmitted by the frame F are written. The field following the data is the check code (CRC check code ;error detection code) by means of which the end of the frame can be detected.

When a multiplex node (as a transmission node) transmits a frame F, it transmits an ACK field (reception acknowledgement area) following the frame F. The ACK field comprises five bits (equal to the number of the nodes connected to the multiplex transmission path 2) and a predetermined specific bit area is assigned to each multiplex node. The transmission node judges whether the frame F has been properly transmitted to the reception multiplex nodes through the signals in the bit areas which are specific to the reception nodes. That is, the transmission node transmits the ACK field with the signal in each bit area set to "0", and each of the reception nodes judges whether the contents of the data 1 to N in received frame are correct by means of the check code, if they are correct, each of the reception nodes sends "1" as a reception acknowledgement signal (ACK signal) to the bit area assigned thereto. Also the transmission node receives the signal frame which has been transmitted by the transmission node itself and when it properly receives the signal frame, it sends the ACK signal "1" to the bit area assigned thereto.

Accordingly, when all the multiplex nodes have properly received the signal frame, all the bit areas in the ACK field should have been set to "1". When one or more of the bit areas remain "0", the multiplex nodes corresponding to the bit areas have not properly received the signal frame and accordingly the transmission node re-transmits the same signal frame.

The multiplex transmission in this embodiment is a time division multiplex transmission and each of the multiplex nodes controls its own transmission and reception of signals independently from the other multiplex nodes (distributed control system) as can be understood from the description above. Further each of the multiplex nodes has said node connection information for controlling its transmission and reception of the signals.

The node connection information should be common to all the multiplex nodes in order to properly perform the multiplex transmission control over the whole network, and must be corrected when the condition of connection of the nodes, i.e., whether the multiplex nodes are in normal state or in abnormal state, changes. This correction is effected by each multiplex node independently from the others.

In order to control and correct the node connection information, each time it detects occurrence of abnormality in any one of the other multiplex nodes, each multiplex node transmits an abnormality information signal which informs of the multiplex node in abnormal state together with its own node connection information.

Further each multiplex node does not recognize as normal the multiplex node which should be in abnormal state on the basis of its own node connection information and does not permit the latter multiplex node to join the network until the former receives a return-to-normal signal from the latter.

On the other hand, a multiplex node which has been in abnormal state and has ascertained that the multiplex node itself returns to normal transmits the return-to-normal signal to inform the other multiplex nodes that it has returned to normal. In this case, the multiplex node does not transmit its own node connection information.

In the case where a multiplex node which is in normal state should be in abnormal state according to the node connection information in the abnormality information signal transmitted from another multiplex node, the multiplex node transmits the return-to-normal signal. Thus, the abnormality information signal including the node connection information also functions as a signal reminding the node which has returned to normal to transmit the return-to-normal signal.

When one multiplex node realizes that another multiplex node which should be in abnormal state according to the node connection information of said one multiplex node should be in normal state according to the node connection information of one or more of the other multiplex nodes, said one multiplex node transmits a request signal which requests to said another multiplex node to transmit the return-to-normal signal.

If the multiplex nodes are arranged so that they transmits the request signals as soon as they realize the inconsistency in the node connection informations, a plurality of request signals can be transmitted at one time to excessively increase the traffic amount and adversely affect the transmission efficiency of the system in the case where a plurality of multiplex nodes simultaneously realize the inconsistency.

Accordingly, in this embodiment, the multiplex nodes are arranged so that they transmits the request signal different predetermined times after realization of the inconsistency in the node connection informations and do not transmit the request signal when they receive the request signal transmitted from any other multiplex node.

Thus in this embodiment, only one multiplex node actually transmits the request signal even if a plurality of multiplex nodes simultaneously realize an inconsistency in the node connection informations, whereby the traffic amount cannot be largely increased. That is, the multiplex node whose waiting time (said predetermined time) is the shortest transmits the request signal and when the other multiplex nodes receive the request signal, they no longer transmit the request signal. If the multiplex node whose waiting time is the shortest does not transmit the request signal for some reason, then the multiplex node whose waiting time is the second shortest transmits the request signal and when the other multiplex nodes receive the request signal, they no longer transmit the request signal.

When the multiplex node which should be in abnormal state according to the node connection informations of the part of the multiplex nodes transmits the return-to-normal signal in response to the request signal, the part of the multiplex nodes correct their own node connection informations.

A concrete example of processing which is performed when an inconsistency in the node connection informations is realized will be described in detail with reference to FIG. 3A, hereinbelow. Nodes A to E in FIG. 3A respectively correspond to one of the multiplex nodes 4, 6, 8, 10 and 12 in FIG. 1.

It is assumed that the node A detects that the node E is in abnormal state, the node D is in normal state, and the node D should be in normal state according to the node connection information of the node A while the node D should be in abnormal state according to the node connection informations of the nodes B and C. In this case, the node A first transmits the abnormality information signal F1 which informs that the node E is in abnormal state and includes the node connection information of the node A as described above. The abnormality information signal F1 is received by the nodes B, C and D and the nodes B, C and D correct their node connection informations to represent than the node E is in abnormal state. At the same time, the nodes B and C transmit the request signals for requesting the node D to transmit the return-to-normal signal if it is in normal state.

Figure 3A:
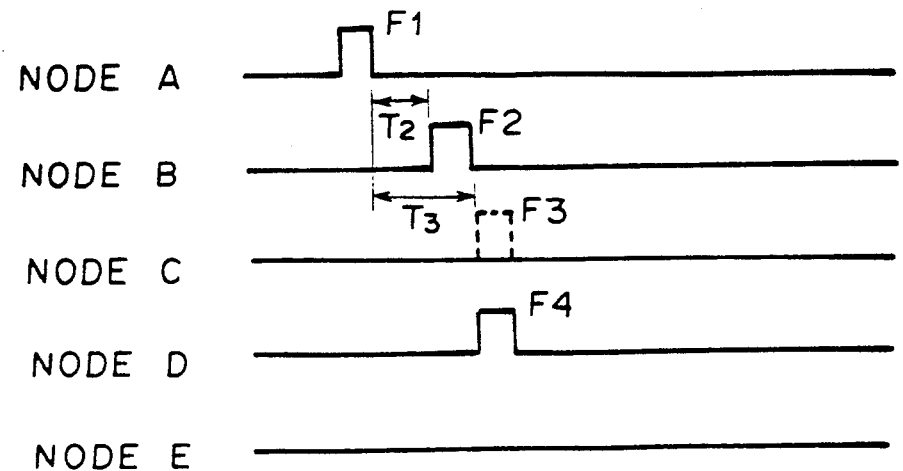
FIG. 3A is a time chart when the request signal is transmitted upon realization of an inconsistency in the node connection informations, FIG. 3B a time chart when the request signal is transmitted upon reception of the return-to-normal signal.

The nodes A to E are arranged to transmit the request signals predetermined waiting times T1 to T5 after realization of the inconsistency in the node connection informations as shown in FIG. 3A (though the waiting times T1, T4 and T5 are not shown in FIG. 3A). The waiting times T1 to T5 are different from each other and are short in this order. Since the waiting time T2 is shorter than the waiting time T3, when the waiting time T2 lapses after transmission of the abnormality information signal F1 from the node A, the node B transmits the request signal F2. When the node C receives the request signal F2, it does not transmit the request signal F3 even after the waiting time T3 lapses after transmission of the abnormality information signal F1 from the node A. The node D transmits the return-to-normal signal F4 upon reception of the request signal F2, and the nodes B and C correct their own node connection informations upon reception of the return-to-normal signal F4. In the case where the node B does not transmit the request signal F2 for some reason, the node C transmits the request signal F3 when the waiting time T3 lapses after transmission of the abnormality information signal F1 from the node A.

In this embodiment, the node (B, C) transmits, as the request signal (F2, F3), a signal including therein its own node connection information. According to the node connection information, the node D should be in abnormal state, and accordingly, if the node D is actually in normal state, the node D will transmit the return-to-normal signal F4 upon reception of the node connection information as described above. Thus the signal including therein the node connection information can function as the request signal.

FIG. 4 is a flow chart for illustrating an example of the procedure which each multiplex node performs upon realization of an inconsistency in the node connection informations. That is, when the multiplex node receives a signal (need not be the abnormality information signal described above) including therein the node connection information while it is performing the multiplex transmission control, it determines whether it realizes an inconsistency between its own node connection information and the node connection information received. (steps S1 to S3) When it is determined that there is an inconsistency therebetween, the multiplex node resets count t to 0 in step S4. Then the multiplex node causes a counter to start counting in step S5, and it determines in step S6 whether the count t is smaller than a predetermined value $t_i$ which corresponds to the waiting time specific to the multiplex node. So long as the former is smaller than the latter, the multiplex node determines in step S7 whether it has received a request signal. When it is determined that the multiplex node has received the request signal it returns to step S2. Otherwise the multiplex node repeats steps S5 to S7 until the count t exceeds the predetermined value $t_i$. When the count t exceeds the predetermined value $t_i$, the multiplex node transmits the request signal in step S8.

When a multiplex node which has been in abnormal state returns to normal and realizes the fact for itself, the multiplex node transmits a return-to-normal signal as described above. The other multiplex nodes transmit request signals for requesting the multiplex node to re-transmit the return-to-normal signal when they receive the first return-to-normal signal.

If the multiplex nodes are arranged so that they transmit the request signals as soon as they receive the return-to-normal signal, a plurality of request signals can be transmitted at one time to excessively increase the traffic amount and adversely affect the transmission efficiency of the system.

Accordingly, in this embodiment, the multiplex nodes are arranged so that they transmit the request signal at different predetermined times after reception of the return-to-normal signal and do not transmit the request signal when they receive the request signal transmitted from any other multiplex node.

Thus in this embodiment, only one multiplex node actually transmits the request signal when a multiplex node returns to normal and transmits the return-to-normal signal, whereby the traffic amount cannot be largely increased. That is, the multiplex node whose waiting time (said predetermined time) is the shortest transmits the request signal and when the other multiplex nodes receive the request signal, they no longer transmit the request signal. If the multiplex node whose waiting time is the shortest does not transmit the request signal for some reason, then the multiplex node whose waiting time is the second shortest transmits the request signal and when the other multiplex nodes receive the request signal, they no longer transmit the request signal.

When the multiplex node which has returned to normal re-transmits the return-to-normal signal in response to the request signal, the other multiplex nodes correct their own node connection informations.

A concrete example of processing which is performed when a multiplex node which has been in and abnormal state and returns to normal will be described in detail with reference to FIG. 3B, hereinbelow. Nodes A to E in FIG. 3B respectively correspond to one of the multiplex nodes 4, 6, 8, 10 and 12 in FIG. 1.

It is assumed that the node A has returned to normal and transmits a return-to-normal signal while the other nodes B, C, D and E are all in normal state.

Figure 3B:
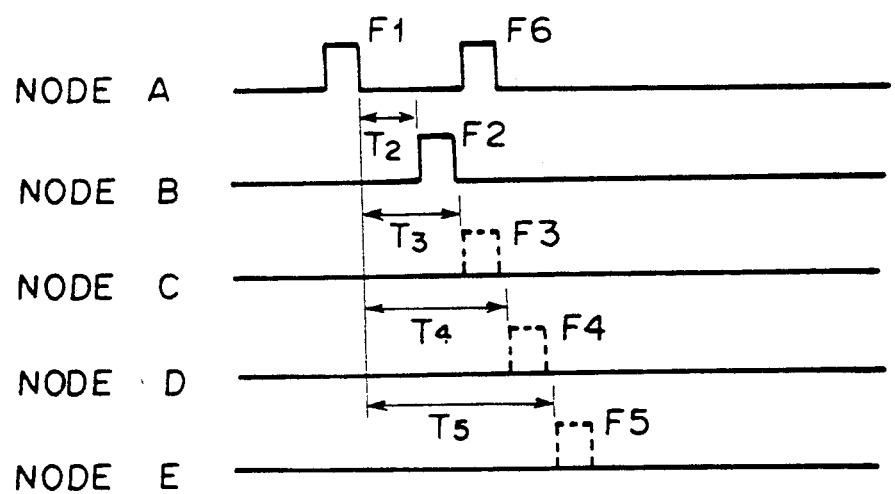

The nodes A to E are arranged to transmit the request signals, for requesting re-transmission of the return-to-normal signal, predetermined waiting times T1 to T5 after reception of the first return-to-normal signal as shown in FIG. 3B (though the waiting time T1, T4 is not shown in FIG. 3B). The waiting times T1 to T5 are different from each other and are short in this order. Since the waiting time T2 is shortest, when the waiting time T2 lapses after transmission of the first return-to-normal signal F1 from the node A, the node B transmits the request signal F2. When the nodes C to E receive the request signal F2, they do not transmit the request signal (F3, F4 and F5) even after their own waiting times T3 to T5 lapse after transmission of the first return-to-normal signal F1 from the node A. The node A transmits a second return-to-normal signal F6 upon reception of the request signal F2, and the nodes B to E correct their own node connection informations upon reception of the second return-to-normal signal F6. In the case where the node B does not transmit the request signal F2 for some reason, the node C transmits the request signal F3 when the waiting time T3 lapses after transmission of the first return-to-normal signal signal F1 from the node A. When neither the node B and C transmits the request signal for some reason, the node D transmits the request signal F4 when the waiting time T3 lapses after transmission of the first return-to-normal signal signal F1 from the node A, and so on.

In this embodiment, the node (B, C, D and E) transmits, as the request signal (F2, F3, F4 and F5), a signal including therein its own node connection information. According to the node connection information, the node A should be in abnormal state, and accordingly, if the node A is actually in normal state, the node A will transmit the second return-to-normal signal F6 upon reception of the node connection information as described above. Thus the signal including therein the node connection information can function as the request signal. Further the node A which has just returned to normal can take the node connection information included in the request signal as its own node connection information, whereby all the nodes including the node A which has just returned to normal can have the same node connection informations.

Figure 5:
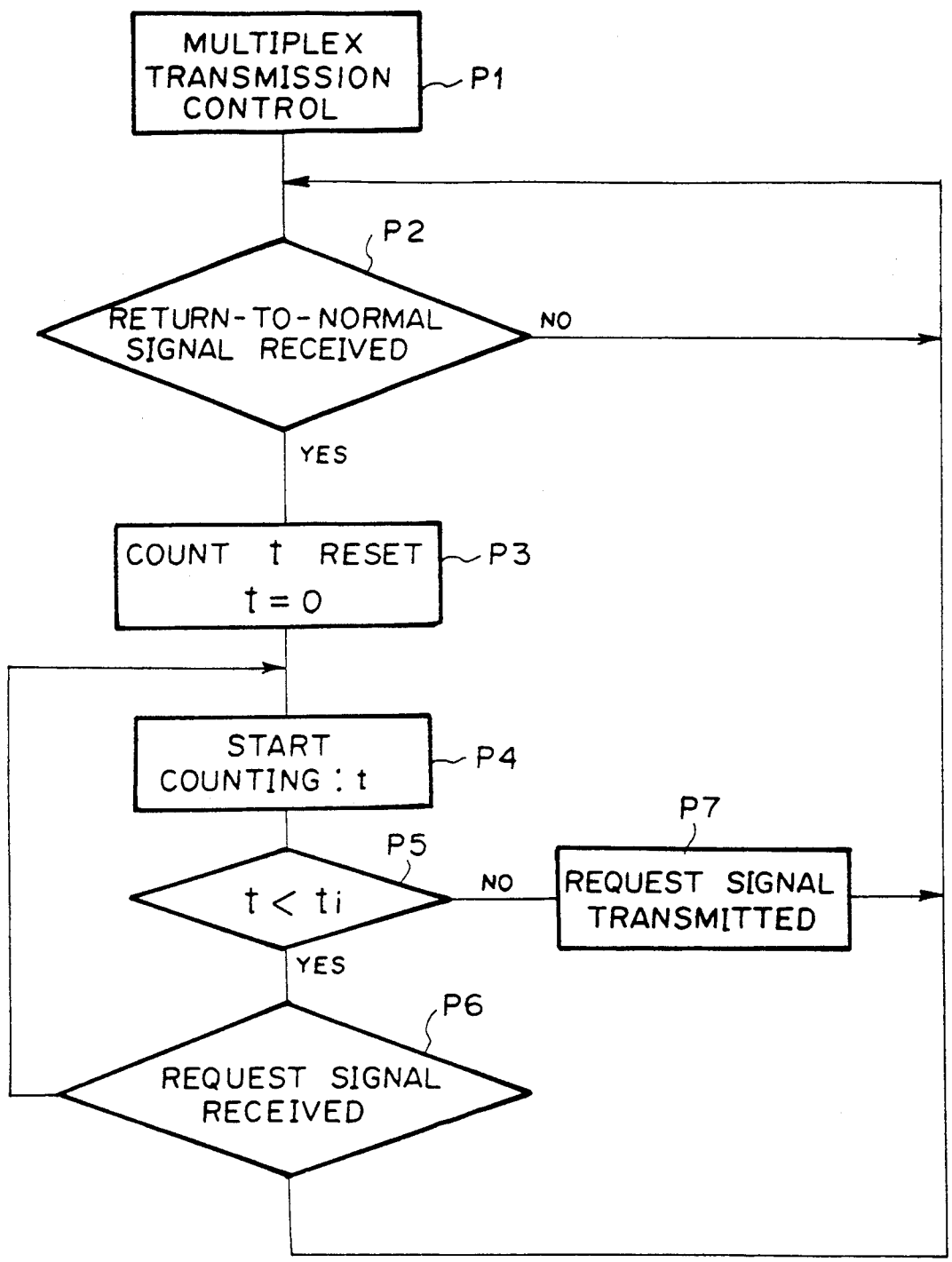
FIG. 5 is a flow chart for illustrating an example of the procedure which each multiplex node performs upon reception of a return-to-normal signal.

FIG. 5 is a flow chart for illustrating an example of the procedure which each multiplex node performs upon reception of a return-to-normal signal. That is, when the multiplex node receives a return-to-normal signal while it is performing the multiplex transmission control, it resets count t to 0. (steps P1 to P3) Then the multiplex node causes a counter to start counting in step P4, and it determines in step P5 whether the count t is smaller than a predetermined value $t_i$ which corresponds to the waiting time specific to the multiplex node. So long as the former is smaller than the latter, the multiplex node determines in step P6 whether it has received a request signal. When it is determined that the multiplex node has received the request signal it returns to step P2. Otherwise the multiplex node repeats steps P4 to P6 until the count t exceeds the predetermined value $t_i$. When the count t exceeds the predetermined value $t_i$, the multiplex node transmits the request signal in step P7.

What is claimed is:

1. A method of multiplex transmission for effecting multiplex transmission among a plurality of multiplex nodes, said plurality of multiplex nodes including at least one first multiplex node, at least one second multiplex node and remaining multiplex nodes, each connected to a transmission path, in which each multiplex node has its own node connection information for controlling its signal transmission and reception, and is capable of controlling and correcting the node connection information; wherein when said at least one first multiplex node finds that said at least one second multiplex node is in a normal state according to the node connection information of said at least one first multiplex node and said remaining multiplex nodes find that said at least one second multiplex node is in an abnormal state according to the node connection information of said remaining multiplex nodes, and when it is recognized that there is inconsistency in the node connection information between said at least one first multiplex node and said remaining multiplex node and the state of said at least one second multiplex node should be recognized as normal, said remaining multiplex nodes transmit a request signal, which requests said at least one second multiplex node to transmit a return-to-normal signal which represents that said at least one second multiplex node has returned to normal, and each of said remaining multiplex nodes corrects its own node connection information regarding said at least one second multiplex node when it receives the return-to-normal signal from said at least one second multiplex node; characterized in that;

said remaining multiplex nodes transmit said request signal at a predetermined time after a recognition of the inconsistency if they have received no request signal transmitted from any other multiplex node by that time, said predetermined time differing from node to node. Such that said remaining multiplex nodes transmit no request signal if they have received a request signal transmitted from any other multiplex node.

2. A method of multiplex transmission as defined in claim 1 in which each multiplex node transmits, as the request signal, a signal including therein its own node connection information.

3. A method of multiplex transmission for effecting multiplex transmission among a plurality of multiplex nodes, said plurality of multiplex nodes including a first multiplex node and remaining nodes, each connected to a transmission path, in which each multiplex node has its own node connection information for controlling its signal transmission and reception, and is capable of controlling and correcting the node connection information; wherein when said first multiplex node returns from an abnormal state to normal state, said first multiplex node transmits a first return-to-normal signal; said remaining multiplex nodes transmit, upon receiving of the first return-to-normal signal, a request signal for requesting said first multiplex node to transmit a second return-to-normal signal so that it can be checked whether said first multiplex node has really returned to normal; and each of said remaining multiplex nodes corrects its own node connection information regarding said first multiplex node when it receives the second return-to-normal signal transmitted from said first multiplex node in response to the request signal; characterized in that;

said remaining multiplex nodes transmit said request signal at a predetermined time after receiving of the first return-to-normal signal if they have received no request signal transmitted from any other multiplex node by that time, said predetermined time differing from node to node, such that said remaining multiplex nodes transmit no request signal if they have received a request signal transmitted from any other multiplex node.

4. A method of multiplex transmission as defined in claim 3 in which each multiplex node transmits, as the request signal, a signal including therein its own node connection information.

* * * * *